(12) United States Patent
Dubois et al.

(10) Patent No.: US 7,474,411 B2
(45) Date of Patent: Jan. 6, 2009

(54) SYSTEM AND METHOD TO REDUCE LASER NOISE FOR IMPROVED INTERFEROMETRIC LASER ULTRASOUND DETECTION

(75) Inventors: Marc Dubois, Clifton Park, NY (US); Kent C. Burr, Latham, NY (US); Thomas E. Drake, Jr., Fort Worth, TX (US); Peter W. Lorraine, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 505 days.

(21) Appl. No.: 10/703,655

(22) Filed: Nov. 7, 2003

(65) Prior Publication Data

US 2005/0099634 A1  May 12, 2005

(51) Int. Cl.
*G01B 9/02* (2006.01)
(52) U.S. Cl. .................................................... 356/502
(58) Field of Classification Search ................ 356/502, 356/498, 503, 506, 511, 504; 73/602
See application file for complete search history.

(56) References Cited

U.S. PATENT DOCUMENTS

| 4,659,224 | A | * | 4/1987 | Monchalin | 356/502 |
| 5,080,491 | A | * | 1/1992 | Monchalin et al. | 356/493 |
| 5,402,233 | A | * | 3/1995 | Schultz et al. | 356/493 |
| 5,546,187 | A | * | 8/1996 | Pepper et al. | 356/487 |
| 5,590,143 | A | * | 12/1996 | Takara et al. | 372/28 |
| 6,115,127 | A | * | 9/2000 | Brodeur et al. | 356/503 |
| 6,176,135 | B1 | * | 1/2001 | Dubois et al. | 73/643 |
| 6,182,512 | B1 | * | 2/2001 | Lorraine | 73/655 |
| 6,481,289 | B2 | * | 11/2002 | Dixon et al. | 73/602 |
| 6,532,821 | B2 | * | 3/2003 | Lamouche et al. | 73/643 |
| 6,657,733 | B1 | * | 12/2003 | Drake, Jr. | 356/511 |
| 6,735,229 | B1 | * | 5/2004 | Delfyett et al. | 372/38.08 |
| 6,769,307 | B1 | * | 8/2004 | Dixon et al. | 73/602 |
| 6,813,447 | B2 | * | 11/2004 | Ellis et al. | 398/155 |
| 6,813,951 | B2 | * | 11/2004 | Blouin et al. | 73/643 |

* cited by examiner

*Primary Examiner*—Hwa S Lee (Andrew)
(74) *Attorney, Agent, or Firm*—Bracewell & Giuliani LLP

(57) ABSTRACT

The present invention provides an optical filter assembly that reduces the phase and amplitude noise of a detection laser used to detect ultrasonic displacements. The filtered detection laser is directed to the surface of a remote target. Ultrasonic displacements at the surface scatter the filtered detection laser. Collection optics then gather phase modulated light scattered by the surface and direct the phase modulated light to an optical processor to produce a signal representative of the ultrasonic displacements with an improved SNR. Additional processors may determine the structure of the remote target.

18 Claims, 10 Drawing Sheets

SYSTEM AND METHOD TO REDUCE LASER NOISE FOR IMPROVED INTERFEROMETRIC LASER ULTRASOUND DETECTION

TECHNICAL FIELD OF THE INVENTION

The present invention relates generally to the generation and detection of ultrasound in materials using lasers, and more particularly, to a system and method that significantly reduces laser noise for laser ultrasound detection.

BACKGROUND OF THE INVENTION

In recent years, the use of advanced composite structures has experienced tremendous growth in the aerospace, automotive, and many other commercial industries. While composite materials offer significant improvements in performance, they require strict quality control procedures in the manufacturing processes. Specifically, non-destructive evaluation (NDE) methods must assess the structural integrity of composite materials. This assessment detects inclusions, delaminations and porosities. Conventional NDE methods are slow, labor-intensive, and costly. As a result, testing procedures adversely increase the manufacturing costs associated with composite structures.

Various methods and apparatuses have been proposed to assess the structural integrity of composite structures. One method generates and detects ultrasound using lasers. A pulsed laser beam generating ultrasound on a work piece while a second pulsed laser detects the ultrasound. The detection laser, coupled to an interferometer, detects surface displacements or velocity.

In theory, the signal-to-noise ratio (SNR) of a laser-ultrasound detection system should increase as the square root of the light power. However, in practice, as the SNR increases, measurements become more and more sensitive to laser noise. Even when using the quietest single-mode lasers, laser-ultrasound SNR is limited to a maximum value even when detected light power keeps increasing. Experimental results shown in FIG. 1 demonstrate that SNR does not increase when detection laser power increases above 10 mW. Amplitude and phase noises of the detection laser limit the SNR. Being able to overcome this limitation in SNR means that smaller defects could be more easily detected in materials difficult to inspect.

One solution to reject amplitude noise uses a differential interferometric configuration. However this configuration does not reject phase noise. Although SNR improves with this configuration, SNR can become limited by phase noise for large quantities of detected light. Another solution has been to average when SNR is limited by laser noise. However, averaging is slow and SNR increases as the square root of the number of averages. Averaging is therefore an expensive and time-consuming option. A faster and less expensive method to reduce noise and increase SNR is highly desirable.

SUMMARY OF THE INVENTION

The present invention provides an apparatus and method to detect ultrasonic surface displacements on a remote target that substantially eliminates or reduces disadvantages and problems associated with previously developed systems and methods. More specifically, the present invention provides a method and system to detect ultrasonic surface displacements on a remote target using laser ultrasound with reduced noise and improved SNR. The system may include a first pulsed laser to generate a first pulsed laser beam that produces ultrasonic displacements at the surface of the remote target such as a composite material under test. Another laser source generates a detection laser beam to detect ultrasonic displacements at the surface. An optical filter removes noise from the detection laser beam. This noise may include phase and/or amplitude noise. One embodiment employs a Sagnac cavity to filter the noise. However, other filters known by those skilled in the art may be used. The detection laser beam interacts with the ultrasonic displacements to produce phase-modulated light. This phase modulated light, scattered or reflected at the surface of the target is collected for optical processing. An interferometer then processes the collected phase modulated light to generate an output signal containing data representative of the ultrasonic surface displacements on the surface of the remote target. This signal may be further processed to reveal the structure of the remote target.

Another embodiment provides a method for ultrasonic laser that detects ultrasonic surface displacements on the surface of a remote target. A detection laser beam is filtered prior to illuminating the surface of the remote target. A second laser may be used to generate ultrasonic displacements at the target's surface. Ultrasonic displacements scatter or reflect the detection laser beam to produce phase-modulated light. The phase modulated light, reflected or scattered by the remote target, is collected for processing, which yields data representative of the ultrasonic surface displacements of the surface of the remote target.

In either case, filtering the detection laser allows very high SNR laser-ultrasound measurements to be made without the need to average over time. This results in the ability to detect defects within materials, such as composite material, quickly.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

Figure 5:
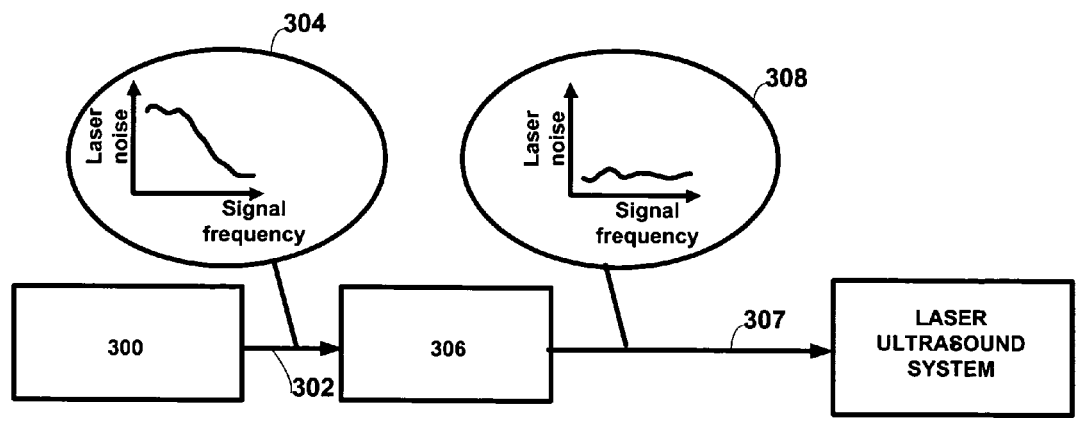
FIG. 5 depicts an optical filter optically coupled to the detection laser source to remove noise.

Embodiments of the present invention are illustrated in FIG. 5, like numerals being used for like and corresponding parts of the various drawings.

Figure 2:
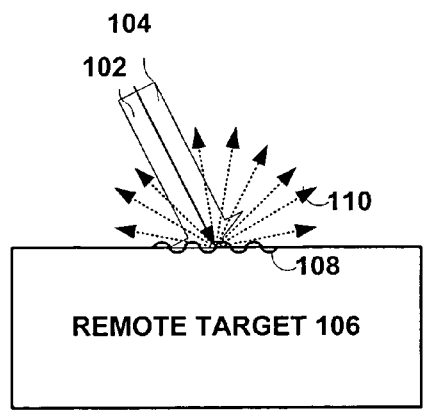
FIG. 2 illustrates the use of generation laser beam and a detection laser beam to generate and detect laser ultrasound.

FIG. 2 illustrates two incoming laser beams, which include a laser beam 102 to generate ultrasound and a detection laser beam 104 to detect the ultrasound at a remote target 106, such as a composite material under test. These lasers may be coaxially applied to remote target 106. Generation laser beam 102 causes thermoelastic expansion in target 106 in the form of ultrasonic deformations 108. Deformations 108 modulate, scatter and reflect detection laser beam 104 to produce phase-modulated light 110 directed away from target 106.

Figure 3:
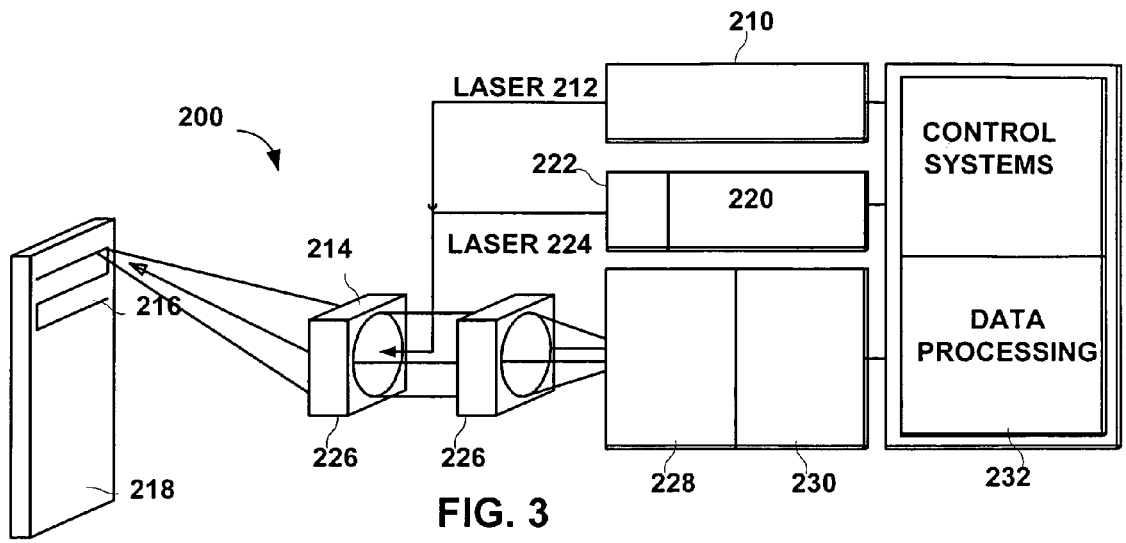
FIG. 3 provides a block diagram to show the basic components of laser ultrasound system.

FIG. 3 provides a block diagram with the basic components for performing ultrasonic laser testing. Generation laser 210 produces a laser beam 212 which optical assembly 214 directs to composite material 216 under test. As shown, optical assembly 214 includes a scanner or other like mechanism that moves laser beam 212 along a scan or test plan 218. Generation laser 210 produces a compressional ultrasonic wave 108 in material normal to the surface of the target 216.

The compressional ultrasonic wave is the result of thermoelastic expansion of the composite material as the material absorbs the generation laser beam. Composite material 216 readily absorbs generation laser beam 212 without ablating or breaking down. Generation laser beam 212 has an appropriate pulse duration to induce ultrasonic surface deformations. For example, a transverse-excited atmospheric (TEA) $CO_2$ laser can produce a 10.6 micron wavelength beam for a 100 nanosecond pulse. The power of the laser must be sufficient to deliver, for example, a 0.25 joule pulse to the target, which may require a 100 watt laser operating at a 400 Hz pulse repetition rate. Generation laser beam 212 absorbs as heat into the target surface thereby causing thermoelastic expansion without ablation.

Detection laser 220 has a sufficient pulse duration as to not induce ultrasonic displacements. For example, a Nd:YAG laser can be used. The power of this laser must be sufficient to deliver, for example, a 100 milli-joule, 100 microsecond pulse, which may require a one kilowatt laser.

Detection laser 220 generates detection laser beam 222 and includes or optical couples to filtering mechanism 224 to remove noise from detection laser beam 224. Optical assembly 214 directs detection laser beam 224 to the surface of composite material 216, which scatters and/or reflects detection laser beam 224. Resultant phase modulated light is collected by collection optics 226. As shown here, scattered and/or reflected detection laser travels back through optical assembly 214. Optional optical processor 228 and interferometer 230 process the phase modulated light to produce a signal containing information representative of the ultrasonic displacements at the surface of composite material 216.

Figure 4:
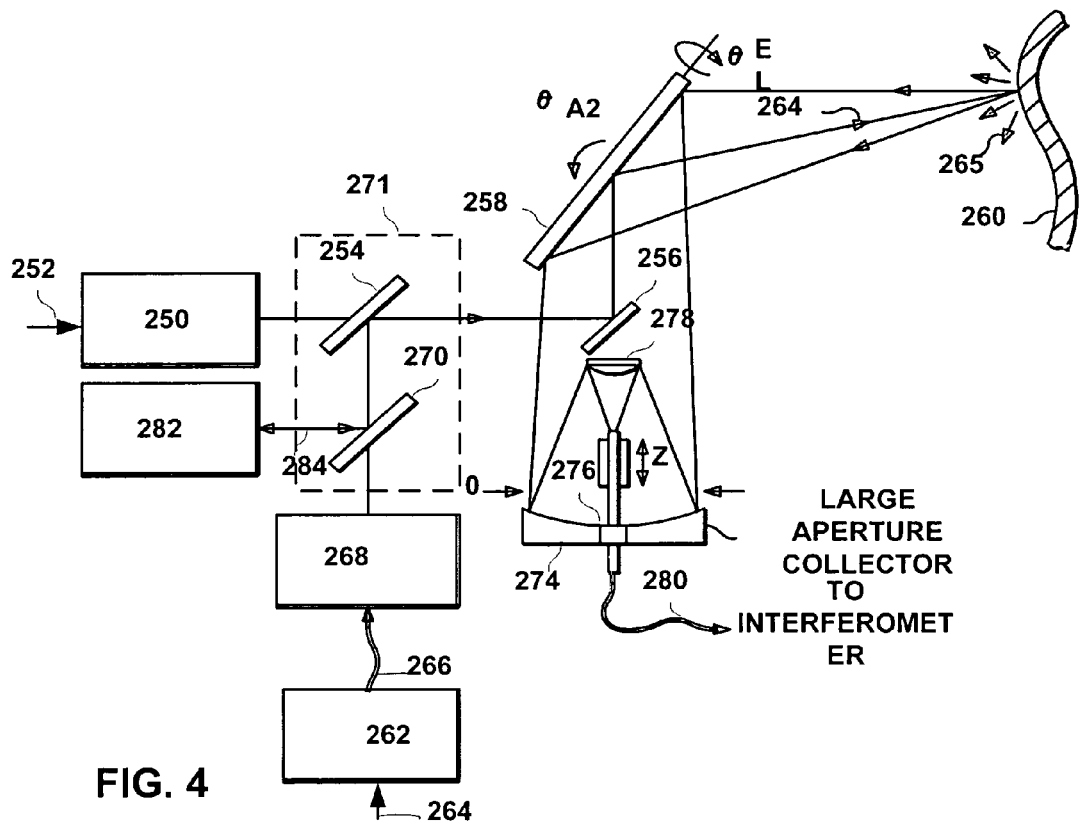
FIG. 4 depicts laser ultrasound systems that incorporates a large aperture optical scanner.

FIG. 4 depicts a large aperture optical scanning configuration with an integrated distance ranging unit. Generation laser focus optics 250 focuses generation laser beam 252 through optical assembly 254 that is transmissive to generation laser beam 252. Reflective surface 256 then directs generation laser beam 252 upon large aperture scanner 258. In turn, large aperture scanner 258 directs laser beam 252 upon the surface of composite material 260 to induce ultrasonic waves 262.

As shown in FIG. 4, optical filter 262 removes noise from detection laser beam 264. Then, fiber optics 266 directs laser beam 264 into detection optics 268, which focus laser beam 264 through optical assembly 270, wherein optical assembly 270 is transmissive to detection laser beam 264. Detection laser beam 264 reflects off optical assembly 254 and may emerge coaxially with generation laser beam 250. Optical assembly 254 and optical assembly 270 act collectively to form a beam combiner or beam mixer 271. Detection laser beam 264 travels with generation laser beam 250 to turning mirror or reflective surface 256. Reflective surface 256 then directs detection laser beam 264 upon large aperture scanner 258, which, in turn, directs said beam 264 upon the surface of target 260. Detection laser beam 264 interacts with ultrasonic waves present at the surface of target 260 to produce phase modulated light 265. Some of phase modulated light 265 is captured by large aperture scanner 258 and is directed into large aperture collector 274. As shown, large aperture scanner 274 may be constructed with a single-mirror two-axis gimbal configuration with each axis driven via a motor and gear assembly. Large aperture collector 274 may be of a Cassegrain-type reflective optic, having a primary reflective surface 276 that focuses light upon a secondary reflective surface 278. In turn, reflective surface 278 collects and focuses the light into a fiber optic carrier 280 for optical processing.

FIG. 4 also illustrates an integrated optical ranging unit 282, which directs a ranging laser beam 284 at optical assembly 270. This optical assembly directs laser beam 284 towards optical assembly 254. Ranging laser beam 284 may emerge coaxially with generation laser beam 250 and detection laser beam 264. The ranging laser beam follows the same path as detection laser beam 264 and also reflects off the surface of target 260. A portion of the reflected ranging laser, captured by large aperture scanner 258, travels backwards upon its original path.

Scanner 258, collection optics 278 and 276 are generally defined as large apertures having beam apertures larger than approximately 75 mm for distances to the target in the 1000 mm to 4000 mm range. Optical ranging unit 282 determines the distance between the surface of target 260 and scanning apparatus 258. In one embodiment, optical ranging unit 282 both transmits and receives light of the same frequency. Thus, it may be described as a self-contained ranging apparatus. Knowing the distance between the surface of target 260 and scanner 258 allows a topographical contour to be created for target 260. This information may be correlated with the optical data being collected. Generally, this correlation is recorded on a point-by-point basis. FIG. 5 depicts in further detail the production of a detection laser having reduced noise. Noise may include both amplitude and phase noise or other noise associated with lasers as is known to those skilled in the art. Here, detection laser source 300 generates a laser beam 302 having noise as depicted by the spectrum contained in callout 304. Optical filter 306 removes a portion of the noise as evidenced by callout 308. As illustrated, one can clearly see the reduced laser noise contained within the filtered detection laser beam 307 when compared to the unfiltered detection laser. The filtered detection laser is then supplied to a laser ultrasound system such as those discussed in FIGS. 3 and 4.

Figure 6A:
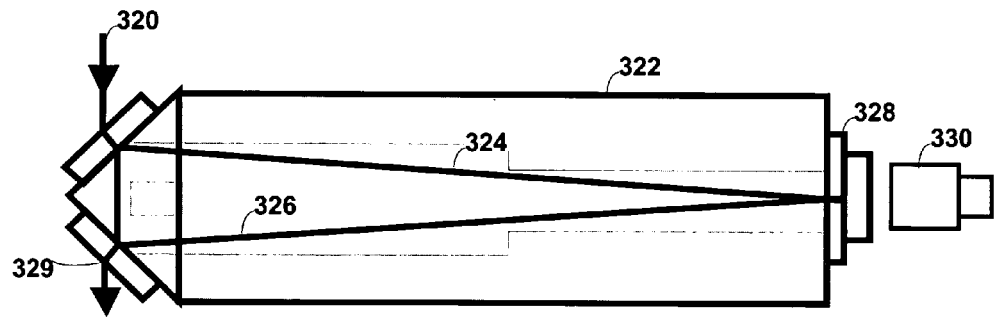
FIG. 6A shows the optical filter of FIG. 5 as a Sagnac cavity.

FIG. 6A depicts one type of optical filter, which may be employed to remove noise from the detection laser. Here, a Sagnac cavity filters noise from the detection laser. This noise may include both phase and amplitude noise. A Sagnac cavity provides an ultra-high Q optical resonator to produce an optical output having a narrow bandwidth. Although other interferometers may be used to filter the detection laser, the Sagnac cavity offers stability and simplified control systems when compared to interferometers such as the Fabry-Perot or Michelson interferometer.

In Sagnac cavity 322, detection laser 320 travels along two paths 324 and 326. These paths are separated by mirror 328. Optional optical video camera 330 allows users to verify that Sagnac cavity 322 is tuned at the desired spatial mode. Optical control system coupled to the cavity allows cavity 322 to remain tuned to the desired spatial mode.

Figure 6B:
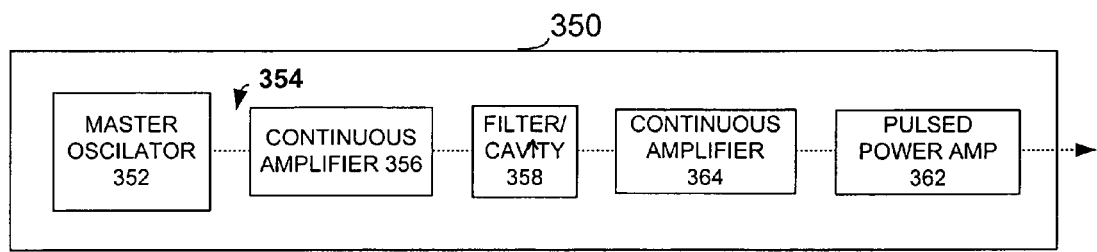
FIG. 6B shows the optical filter as part a of a long-pulse detection laser.

The cavity can filter light received directly from laser source when the detection laser source is continuous. However, for long pulse detection lasers, it might become difficult to stabilize the cavity. Long-pulse detection lasers are generally obtained through a Master-Oscillator Power-Amplification (MOPA) configuration, as is illustrated in FIG. 6B. Here, Master oscillator 352 provides a low power continuous laser beam 354 with a single frequency of operation for the long-pulse detection. The low power continuous laser of Master oscillator 352 stabilizes cavity 358. The master oscillator often comprises a non-planar-ring oscillator even though other types of master oscillators known to those skilled in the art may be used. Cavity 358 filters the noise of laser beam 354 received from master oscillator 352. Prior to filtering, laser beam 354 may be amplified by optional continuous amplifier 364. Once filtered, pulsed power optical amplifier 362 may then amplify laser beam 354. An optional continuous power amplifier 364 (often called pre-amplifier) can be used before or after or both the filtering cavity. FIG. 6B illustrates one implementation of the Sagnac cavity into a MOPA detection laser.

Figure 6C:
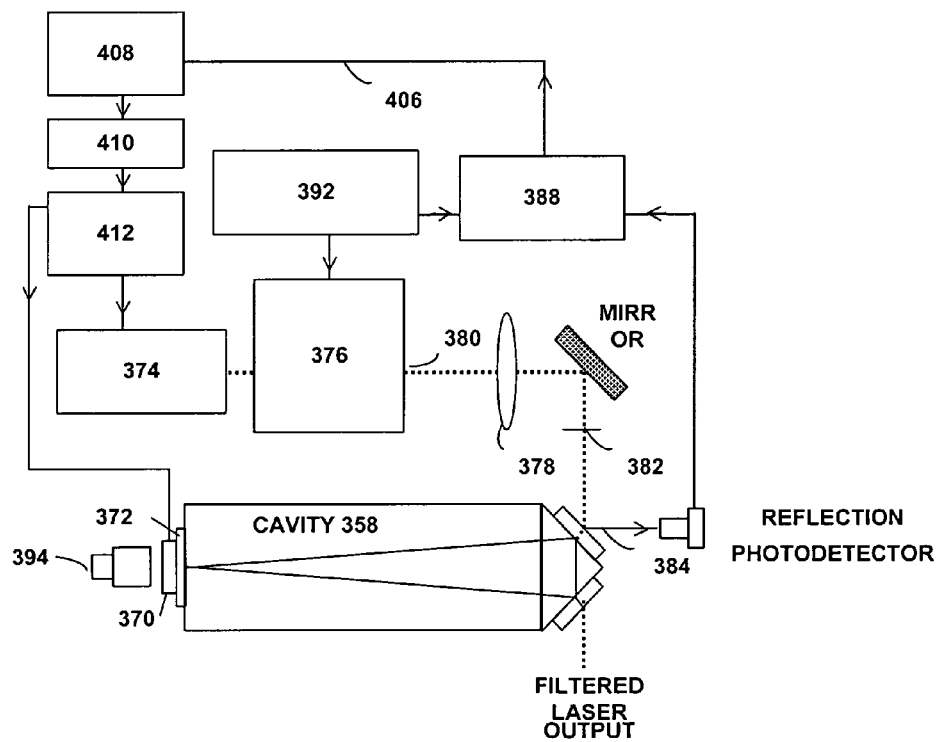
FIG. 6C shows an experimental setup required to use a Sagnac cavity as an optical filter.

Cavity 358 can be tuned to the desired spatial mode corresponding to the detection laser optical frequency by changing the cavity length. FIG. 6C illustrates that the cavity length may be adjusted by changing a voltage applied to piezoelectric transducer (PZT) 370 on which mirror 372 is mounted. Conversely, the detection laser frequency may be tuned to the desired spatial mode of the cavity by adjusting properties or parameters that define the laser. Those properties or parameters may include but need not be limited to the laser cavity length or the laser crystal temperature. It is also possible to combine the two approaches to keep cavity 358 tuned to the desired spatial mode by for example adjusting the cavity length for fast variations and the laser crystal temperature for slow variations.

Whatever parameters are chosen to tune cavity 358 to the desired spatial mode, a control signal is required. In one embodiment, a control signal can be derived from adding a modulation frequency to the detection laser beam. The reflected signal can be used to stabilize the cavity using a Pound-Drever-Hall approach. Other techniques known to those skilled in the art can be used to obtain the control signal.

FIG. 6C depicts one experimental implementation of a Sagnac cavity 358 as an optical filter using the Pound-Drever-Hall approach. Detection laser 374 is first phase modulated at electro-optic phase modulator 376. This modulation takes place at a frequency high enough to be completely rejected by cavity 358 when the cavity is tuned to a given spatial mode. It may me preferred that the modulation take place outside the frequency range of the ultrasonic signal even though theoretically there should not be any remaining modulating frequency in the filtered detection laser. For example, a 15-MHz modulating frequency when the ultrasonic signal of interest is between 1 and 10 MHz. Lens 378 then optically conditions modulated laser beam 380. This conditioning allows laser beam 380 to fit as closely as possible to the cavity spatial mode of interest. Half-wave plate gives the laser beam the correct polarization corresponding to the high finesse of cavity 358. Laser beam 380 then enters cavity 358. The modulated light 384 that comprises the rejected portion of laser beam 380 produces control signal 386. Modulated light 384 is directed to electronic mixer 388 that mixes modulated light 384 with modulating signal 390. Modulator 392 applies modulating signal 390 to both electronic mixer 388 and electro-optic phase modulator 376. The phase of the photo detector signal needs to be adjusted to be in quadrature with modulating signal 390. This can be accomplished by using an electronic phase modifier, by adjusting the cable lengths, or by choosing a modulating frequency that will produce the quadrature between both signals. The resulting signal is a combination of a nearly DC signal and of a modulated signal at nearly twice the modulating frequency. The signal is then filtered to keep only the nearly DC signal. This nearly DC signal will be equal to exactly 0 when cavity 358 is tuned exactly at the spatial mode.

Figure 6D:
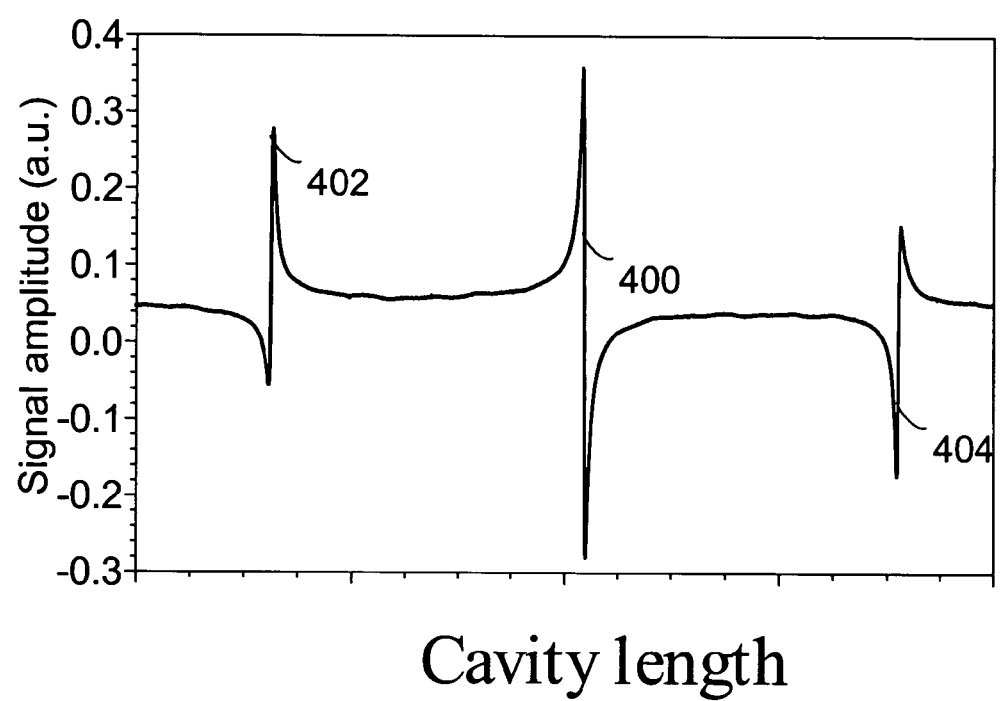
FIG. 6D shows a control signal and cavity modes as seen by the video camera.
Figure 6E:
FIG. 6E shows the video camera output when the cavity is tuned to the desired cavity mode.
Figure 6F:
FIG. 6F shows the camera output when the cavity is tuned to the desired cavity mode.

FIG. 6D shows an example of the filtered control signal when the length of cavity 358 is continuously varied. Cavity 358 must be tuned at the 0 level in the middle of the central bi-polar signal 400. Signals 402 and 404 correspond to the modulated frequencies added to the laser beam to produce a control signal. All spatial modes will produce similar control signals and the correct spatial mode is selected using a video camera 394. FIG. 6E shows the video camera output when cavity 358 is tuned to the desired cavity mode (TEM00) and FIG. 6F shows the camera output when cavity 358 is tuned to a different spatial mode (TEM11). Several different spatial modes are possible.

Control signal 406 is read by analog input device 408 that inputs to processor 410. Filters can be incorporated in the analog input device. Processor 410 uses a set of instructions to decide how to manipulate the different parameters based on the control signal 406. Processor 410 provides an input to analog output device 412 that in turn generates control signals 386 that manipulate crystal temperature, cavity mirror, or PZT 372.

Figure 7:
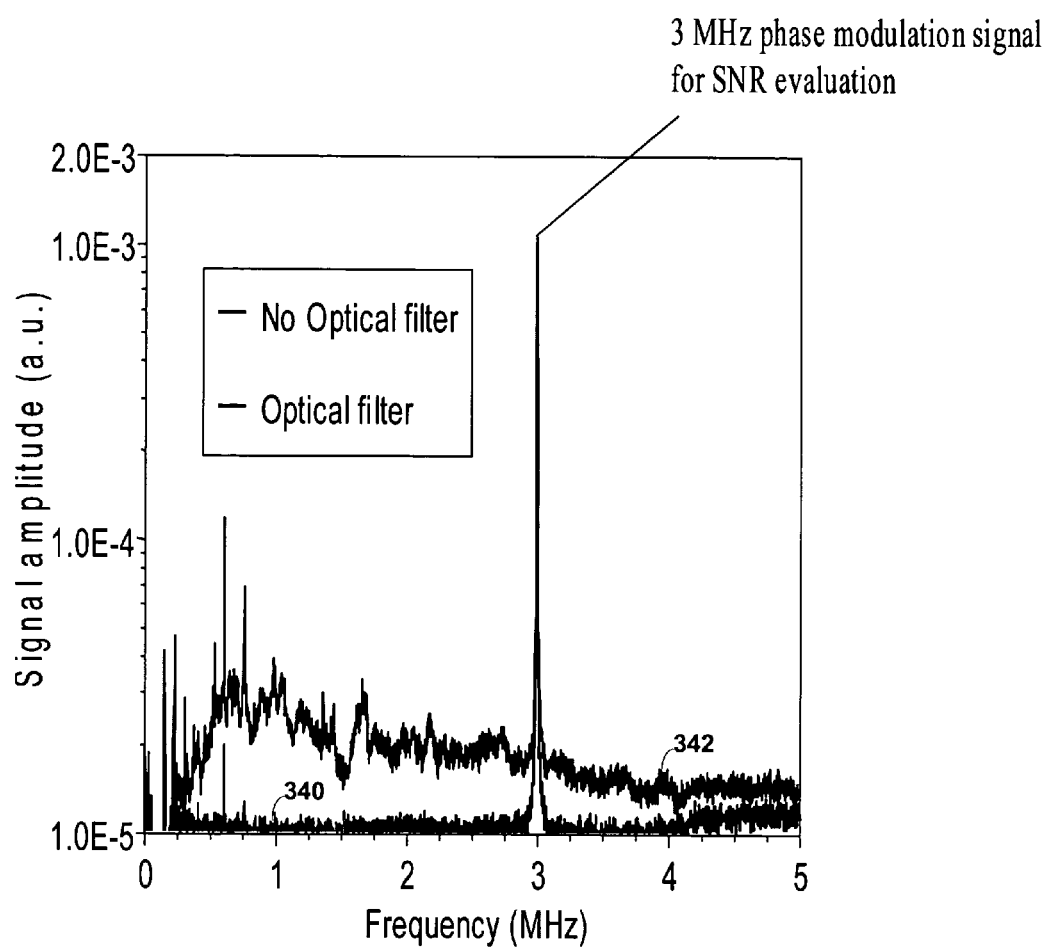
FIG. 7 provides experimental results showing an increased SNR when using an optical filter.

FIG. 7 depicts actual experimental results obtained by an system similar to the one depicted in FIG. 6A and represented by the callouts contained in FIG. 5. One can clearly see the reduced noise contained within experimental results 340 when compared to unfiltered experimental results 342.

Figure 1:
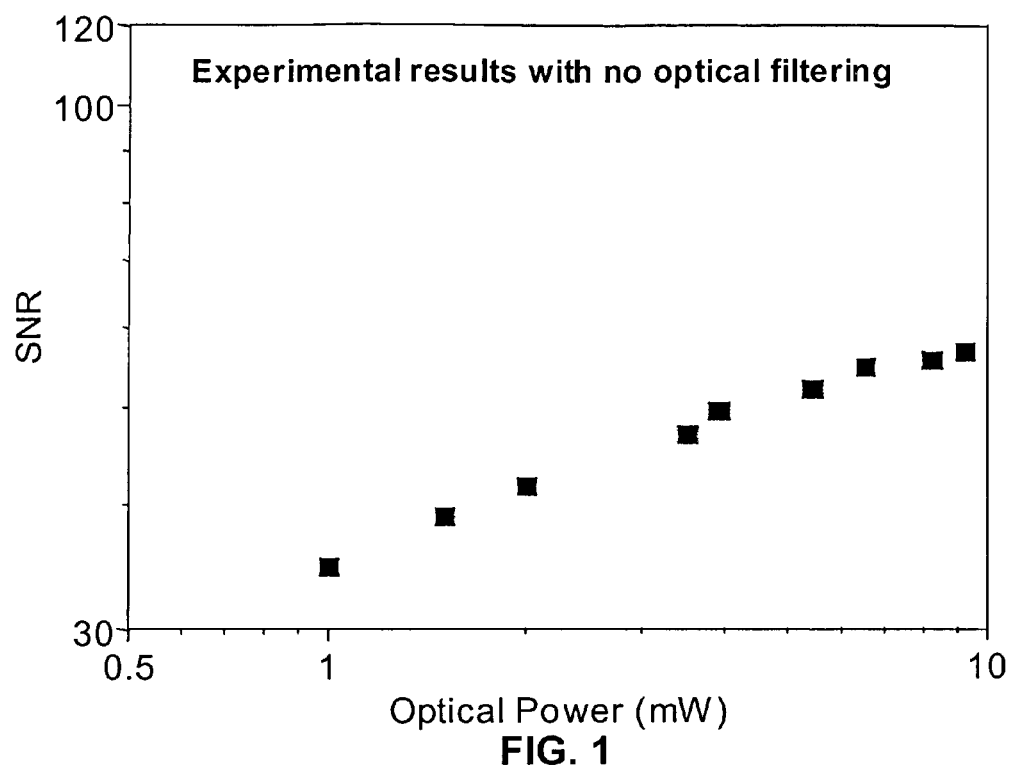
FIG. 1 provides experimental results showing that increasing the detection power in prior art systems fails to provide increased SNR above 10 mW.
Figure 8:
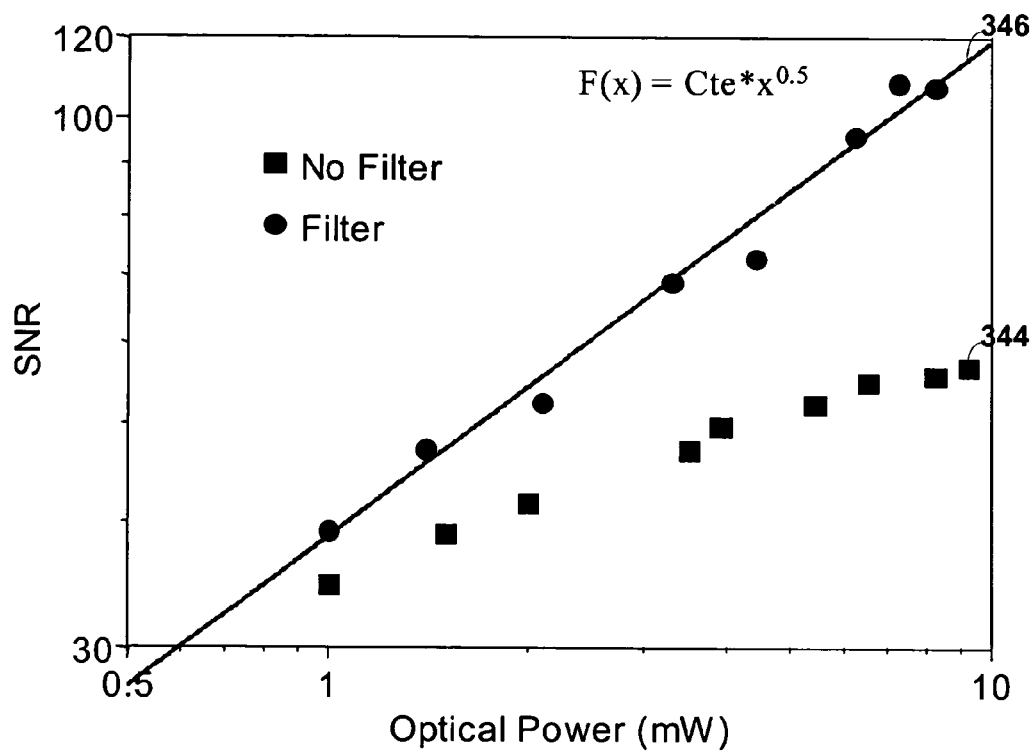
FIG. 8 provides experimental results showing that increased optical power may achieve a greatly increased SNR when compared to previously available unfiltered systems.

FIG. 8 graphically shows the increase in SNR using the optical filter or the detection laser as the detection laser's power is increased. As previously shown in FIG. 1 and again in experimental results 344, no improvement in SNR is observed when the optical power increases above 10 mW even when amplitude noise is rejected. Experimental results 346 show that SNR increases as power increases above 10 mW when the detection laser is optically filtered. This increase in SNR was not previously available.

Figure 9:
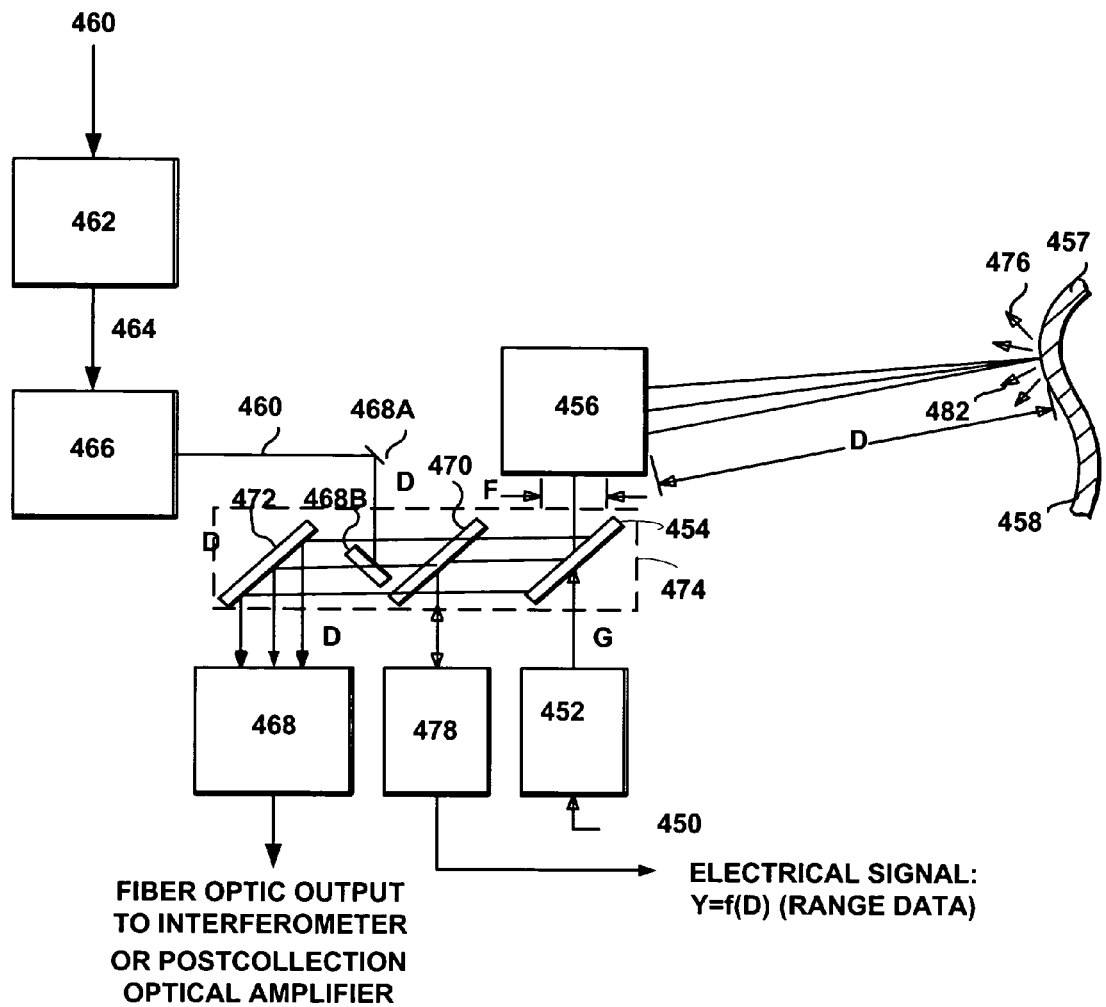
FIG. 9 depicts a laser ultrasound system having a small aperture optical scanner.

FIG. 9 illustrates a laser ultrasound detector having a small aperture optical scanning configuration with an integrated distance ranging unit. Small apertures are generally defined as apertures less than 75 mm for target distances between 1000 mm and 4000 mm. The operation of the small aperture configuration is similar to that of the large aperture optical scanning configuration previously discussed with a slight rearrangement of the optical elements to accommodate the laser beams through the smaller apertures. Generation laser beam 450 is focused by generation optical assembly 452 and passes through optical element 454 to small aperture scanner 456. Here, optical assembly 452 is transmissive to generation laser beam 450. Small aperture scanner 456 directs beam 450 to the surface of target 458. Beam 450 then induces ultrasonic waves 457 at target 458. In one embodiment, small aperture scanner 456 is generally of two-mirror construction with each mirror mounted on orthogonal oriented high-speed galvanometers.

Optical filter 462 removes noise from detection laser beam 460. Fiber optics 464 receive filtered laser beam 460 and direct the beam towards optical assembly 466. Optical assembly 466 then directs laser beam 460 to reflective turning mirrors 468A, 468B and through optical element 470, which is transmissive to detection laser beam 460. Detection laser beam 460 reflects off optical element 454 and may emerge coaxially with generation laser beam 450. The reflective turning mirrors generally have an elliptical profile to produce a small circular diameter exactly matching detection laser beam 450 when operated at 45 degrees angle of incidence. This configuration obscures a minimal amount of collection optic 468. Optical elements 454, 470 and 472 collectively act to form a beam combiner or beam mixer 474.

Detection laser beam 460 travels with generation laser beam 450 to small aperture scanner 456, which directs them to the surface of target 458. Detection laser beam 460 interacts with ultrasonic waves at target 458 to produce phase-modulated light 476. A portion of phase modulated light 476 is captured by small aperture scanner 456 and is directed to small aperture collection optics 468.

As shown in FIG. 9, an integrated optical ranging unit 478 may be incorporated to direct a ranging laser beam 480 upon optical element 470 which, in turn, reflects laser beam 480 towards optical element 454. Ranging laser beam 480 may emerge coaxially with generation laser beam 450 and detection laser beam 460. Ranging laser beam 480 then travels the same path as detection laser beam to the surface of target 458. Reflected or scattered ranging laser light 482 captured by small aperture scanner 456 and directed backwards upon its original path allows optical ranging unit 478 to determine the distance between the scanning apparatus and the surface of target 458. The distance between the scanning apparatus and the surface allows a topographical contour of the target 458 being scanned to be created and correlated with the collected optical data. Generally, this correlation is recorded on a point-by-point basis.

Figure 10:
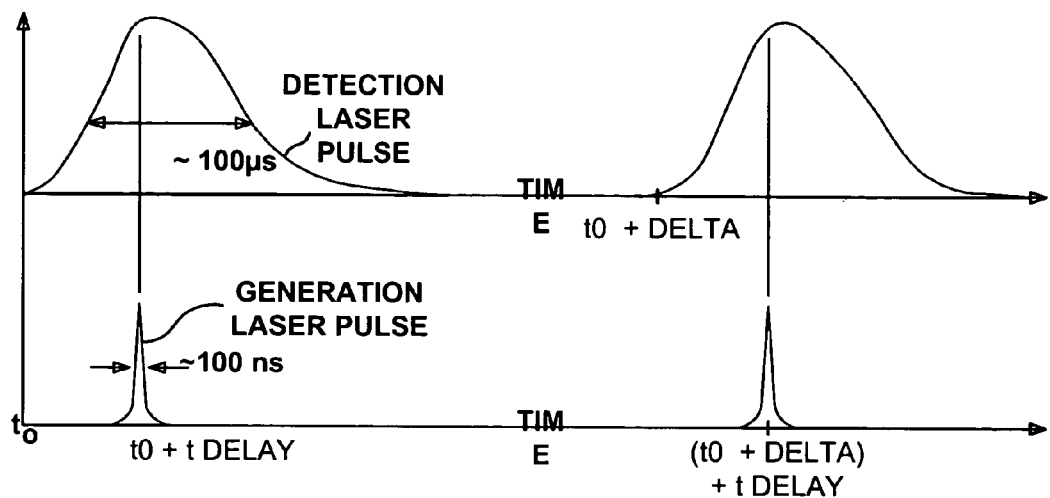
FIG. 10 is a timing diagram for a detection pulse and a generation pulse.

FIG. 10 illustrates the timing relationship between the generation and detection laser pulses. Detection laser beam 600 is fired at $t=t_0$. The magnitude of detection laser beam 600 rises to a maximum before falling off. The pulse width of detection laser beam 600 and generation laser beam 602 are illustrated as 100 microseconds and 100 nS, respectively, though the pulse widths may be varied. Generation laser beam 602 may be ideally fired when detection laser beam 600 is at or near its maximum peak, which time delay after $t_0$ is represented by $t_{delay}$. During testing, detection and generation pulses typically repeat on a periodic basis. For example, with a frequency of 100 Hz or even 1000 Hz and where optical scanner 440 indexes the laser beam to a new position between each pulse, the time delay between subsequent pulses allows ultrasonic activity to dissipate so that there is no overlap between subsequent tests.

Although the present invention has been described in detail, it should be understood that various changes, substitutions and alterations can be made hereto without departing from the spirit and scope of the invention as defined by the appended claims.

What is claimed is:

1. A method for generating and detecting ultrasonic surface displacements on a remote target comprising:
    generating ultrasonic surface displacements at a surface of the remote target;
    generating a detection laser beam;
    optically filtering the detection laser beam, the optical filtering providing at least one of amplitude noise filtration or phase noise filtration;
    directing the detection laser beam to the surface of the target to produce light phase modulated by the ultrasonic displacements;
    collecting the phase modulated light;
    processing the phase modulated light to obtain data representative of the ultrasonic surface displacements at the surface; and
    obtaining data representative of the ultrasonic surface displacements at the surface of the remote target responsive to the processing, wherein optically filtering the detection laser beam comprises passing the detection laser beam through an optical resonant cavity with high finesse, and wherein the optical resonant cavity with high finesse comprises a Sagnac cavity.

2. The method of claim 1, where the mean wherein means of generating the ultrasonic waves at the remote target surface employs a pulsed laser beam, and wherein the method further comprises detecting a defect in the remote target responsive to at least a portion of the obtained data.

3. The method of claim 1, wherein optically filtering the detection laser beam comprises passing the detection laser beam through an optical resonant cavity with high finesse, and wherein the optical resonant cavity with high finesse comprises a Sagnac cavity, a confocal Fabry-Perot cavity, or an ordinary Fabry-Perot cavity.

4. The method of claim 1, wherein optically filtering the detection laser beam comprises passing the detection laser beam through an optical resonant cavity with high finesse, and wherein processing the phase modulated light to obtain data representative of the ultrasonic surface displacements at the surface further comprises:
    demodulating the phase modulated light with an interferometer to create at least one optical signal;
    converting the at least one optical signal into at least one digital signal; and
    using a digital signal processor to process the at least one digital signal.

5. A method for generating and detecting ultrasonic surface displacements on a remote target comprising:
    generating ultrasonic surface displacements at a surface of the remote target;
    generating a detection laser beam;
    optically filtering the detection laser beam by passing the detection laser beam through an optical resonant cavity with high finesse;
    directing the detection laser beam to the surface of the target to produce light phase modulated by the ultrasonic displacements;
    maintaining the optical resonant cavity in a predetermined cavity spatial mode corresponding to a resonance of the optical frequency of the detection laser beam;
    collecting the phase modulated light;
    processing the phase modulated light to obtain data representative of the ultrasonic surface displacements at the surface; and
    obtaining data representative of the ultrasonic surface displacements at the surface of the remote target.

6. The method of claim 5, wherein the detection laser beam is optically amplified before, after, or before and after being optically filtered.

7. The method of claim 6, wherein the detection laser is a non-planar-ring oscillator.

8. The method of claim 6, wherein the cavity is tuned to a predetermined cavity spatial mode by adjusting the length of the optical resonant cavity.

9. The method of claim 6, wherein the predetermined cavity spatial mode is maintained by varying at least one of the length of the laser cavity or the laser crystal temperature.

10. An apparatus to generate and detect ultrasonic surface displacements on a remote target comprising:
- a first pulsed laser source to generate a first pulsed laser beam;
- a detection laser source to generate a detection laser beam;
- an optical filter optically coupled to the detection laser beam, the optical filter adapted to provide at least one of amplitude noise filtration or phase noise filtration;
- a first optical assembly that receives and directs the first pulsed laser beam to the remote target in order to generate ultrasonic surface displacements at the remote target;
- a second optical assembly that receives and directs the detection laser beam to the remote target where ultrasonic surface displacements at the remote target scatter the detection laser beam to produce phase modulated light collection optics to collect the phase modulated light;
- an interferometer to process the phase modulated light and generate at least one output signal; and
- a processor to process the at least one output signal to obtain data representative of the ultrasonic surface displacements on the surface of the remote target wherein the optical filter comprises an optical resonant cavity with high finesse, and wherein the optical resonant cavity comprises at least one of a Sagnac cavity, a confocal Fabry-Perot cavity, or an ordinary Fabry-Perot cavity.

11. The apparatus of claim 10, wherein the optical filter comprises an optical resonant cavity with high finesse, and wherein the detection laser beam comprises 100 millisecond pulses.

12. The apparatus of claim 10, further comprising a control system to maintain the optical resonant cavity in a predetermined cavity spatial mode corresponding to a resonance fiber optical frequency of the detection laser.

13. The apparatus of claim 12, wherein the control system is operable to at least one of adjust the length of the optical resonant cavity or vary the laser crystal temperature.

14. The apparatus of claim 10, further comprising at least one optical amplifier operable to amplify the detection laser beam before, after, or before and after the laser beam is filtered by the optical filter.

15. A method to detect ultrasonic displacements on a remote target comprising:
- generating a detection laser beam;
- optically filtering the detection laser beam, the optical filtering providing at least one of amplitude noise filtration or phase noise filtration;
- directing the detection laser beam to a surface of the remote target;
- scattering the detection laser beam with the ultrasonic surface displacements at the surface to produce phase modulated light;
- collecting the phase modulated light;
- processing the phase modulated light to obtain data representative of the ultrasonic surface displacements at the surface; and
- obtaining data representative of the ultrasonic surface displacements at the surface of the remote target wherein optically filtering the detection laser beam comprises passing the detection laser beam through an optical resonant cavity with high finesse, and wherein the optical resonant cavity comprises a Sagnac cavity.

16. The method of claim 15, wherein optically filtering the detection laser beam comprises passing the detection laser beam through an optical resonator, and wherein the detection laser beam comprises 100 millisecond pulses.

17. The method of claim 16, further comprising tuning the optical resonator to a predetermined spatial mode.

18. The method of claim 15, wherein the detection laser beam is optically amplified before, after, or before and after being optically filtered.

* * * * *